(12) United States Patent
Rajaa et al.

(10) Patent No.: US 8,935,563 B1
(45) Date of Patent: Jan. 13, 2015

(54) SYSTEMS AND METHODS FOR FACILITATING SUBSTANTIALLY CONTINUOUS AVAILABILITY OF MULTI-TIER APPLICATIONS WITHIN COMPUTER CLUSTERS

(75) Inventors: Subash Rajaa, Maharashtra (IN); Sunil Hasbe, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 227 days.

(21) Appl. No.: 13/524,367

(22) Filed: Jun. 15, 2012

(51) Int. Cl.
*G06F 11/00* (2006.01)
(52) U.S. Cl.
USPC ........................................................ 714/4.11
(58) Field of Classification Search
CPC .......................... G06F 11/2028; G06F 11/2038
USPC ........................................................ 714/4.11
See application file for complete search history.

(56) References Cited

U.S. PATENT DOCUMENTS

| | | | |
|---|---|---|---|
| 6,922,791 B2 * | 7/2005 | Mashayekhi et al. | 714/4.11 |
| 7,213,246 B1 * | 5/2007 | van Rietschote et al. | 718/1 |
| 7,783,914 B1 * | 8/2010 | Havemose | 714/4.11 |
| 8,156,490 B2 * | 4/2012 | Bozek et al. | 718/1 |
| 8,185,776 B1 * | 5/2012 | Gentes et al. | 714/4.11 |
| 2011/0023028 A1 * | 1/2011 | Nandagopal et al. | 718/1 |
| 2013/0067267 A1 * | 3/2013 | Tamhane et al. | 714/4.11 |

OTHER PUBLICATIONS

Neverfail, Neverfail vAppHA—Working with vSphere to Deliver Application-Aware High Availability, http://www.neverfailgroup.com/virtualization/application-aware-high-availability.html, as accessed on Mar. 7, 2012.
Neverfail, vAppHA, http://www.neverfailgroup.com/virtualization/vapphatrial.html, as accessed on Mar. 7, 2012.
Dan Kusnetzky, Neverfail launches vAppHA for VMware vSphere 4, http://www.zdnet.com/blog/virtualization/neverfail-launches-vappha-for-vmware-vsphere-4/1276, as accessed on Mar. 7, 2012.
Duncan Epping; VMware vSphere Blog: vApp Startup Order and HA?; vmware; Nov. 11, 2011; http://blogs.vmware.com/vsphere/2011/11/vapp-startup-order-and-ha.html.

* cited by examiner

*Primary Examiner* — Yolanda L Wilson
(74) *Attorney, Agent, or Firm* — ALG Intellectual Property, LLC

(57) ABSTRACT

A computer-implemented method may include (1) identifying at least one computer cluster configured to (a) facilitate substantially continuous availability of at least one multi-tier application that includes a plurality of discrete architectural layers and (b) provide a plurality of virtual machines configured to execute the discrete architectural layers within the multi-tier application, (2) detecting a failure that prevents at least one node within the computer cluster from providing at least one virtual machine configured to execute at least one discrete architectural layer within the multi-tier application, (3) identifying a different node capable of providing the virtual machine within the computer cluster, and then (4) directing the different node within the computer cluster to provide the virtual machine in order to facilitate substantially continuous availability of all of the discrete architectural layers within the multi-tier application despite the detected failure. Various other systems, methods, and computer-readable media are also disclosed.

19 Claims, 8 Drawing Sheets

SYSTEMS AND METHODS FOR FACILITATING SUBSTANTIALLY CONTINUOUS AVAILABILITY OF MULTI-TIER APPLICATIONS WITHIN COMPUTER CLUSTERS

BACKGROUND

In a computer cluster environment, one or more nodes may execute one or more multi-tier applications. For example, a computer cluster may include a node configured to provide a set of virtual machines that each represent a different architectural layer within a multi-tier application. In addition, the computer cluster may include another node configured to provide another set of virtual machines that each represent a different architectural layer within another multi-tier application.

Such a computer cluster environment may also include a failover node capable of assuming responsibility for one or more virtual machines in the event of a system failure affecting one or more nodes within the computer cluster. Unfortunately, while the failover node may assume responsibility for one or more virtual machines in the event of a system failure, the failover node may not have the necessary capacity to assume responsibility for all of the virtual machines affected by the system failure.

Some existing cluster technologies may select the virtual machines that are to fail over to the failover node without taking into account whether such virtual machines represent layers within a multi-tier application. For example, upon detecting a system failure affecting multiple nodes within the computer cluster, a cluster technology may select a subset (i.e., less than all) of the virtual machines associated with the multi-tier application to fail over to the failover node. Unfortunately, the multi-tier application may be unable to function properly after failover since only a subset of the virtual machines associated with the multi-tier application survived the system failure.

As such, the instant disclosure identifies a need for systems and methods for facilitating high availability of multi-tier applications within computer clusters by failing over all of the virtual machines associated with the multi-tier applications during the failover process.

SUMMARY

As will be described in greater detail below, the instant disclosure generally relates to systems and methods for facilitating substantially continuous availability of multi-tier applications within computer clusters. In one example, a computer-implemented method for accomplishing such a task may include (1) identifying at least one computer cluster that includes a plurality of nodes configured to (a) facilitate substantially continuous availability of at least one multi-tier application that includes a plurality of discrete architectural layers and (b) provide a plurality of virtual machines configured to execute the discrete architectural layers within the multi-tier application, (2) detecting a failure that prevents at least one node within the computer cluster from providing at least one virtual machine configured to execute at least one discrete architectural layer within the multi-tier application, (3) identifying a different node capable of providing the virtual machine within the computer cluster, and then (4) directing the different node within the computer cluster to provide the virtual machine in order to facilitate substantially continuous availability of all of the discrete architectural layers within the multi-tier application despite the detected failure.

In some examples, the method may also include identifying at least one other virtual machine configured to execute at least one other application (such as another multi-tier application that includes a plurality of other discrete architectural layers) within the computer cluster. In such examples, the method may further include determining that the node is configured to simultaneously provide both the virtual machine configured to execute the discrete architectural layer within the multi-tier application and the other virtual machine configured to execute the other application. Additionally or alternatively, the method may include determining that at least one other node within the computer cluster is configured to provide the other virtual machine configured to execute the other application.

In some examples, the method may also include determining that the different node is incapable of simultaneously providing both the virtual machine configured to execute the discrete architectural layer within the multi-tier application and the other virtual machine configured to execute the other application. In such examples, the method may further include identifying a priority level assigned to the multi-tier application and another priority level assigned to the other application and then determining, based at least in part on the priority level and the other priority level, that the multi-tier application has priority over the other application. In addition, the method may include directing the different node within the computer cluster to provide the virtual machine configured to execute the discrete architectural layer within the multi-tier application instead of the other virtual machine configured to execute the other application.

In some examples, the method may also include determining that the different node is currently configured to provide the other virtual machine. In such examples, the method may further include directing the different node to replace the other virtual machine with the virtual machine configured to execute the discrete architectural layer within the multi-tier application.

In some examples, the method may also include detecting a failure on the node and accessing information that identifies the nodes on which the virtual machines are configured to execute the discrete architectural layers within the multi-tier application. In such examples, the method may further include determining, based at least in part on the information, that the failed node was configured to execute the virtual machine.

In some examples, the method may also include identifying all of the virtual machines configured to execute the discrete architectural layers within the multi-tier application. In such examples, the method may further include ensuring that the computer cluster provides all of the identified virtual machines after the detected failure.

In some examples, the method may include identifying the different node's capacity to provide virtual machines. In such examples, the method may further include determining, based at least in part on the different node's capacity, that the different node is capable of providing the virtual machine after the detected failure.

In some examples, the method may include identifying an order in which the computer cluster is to initiate the virtual machines configured to execute the discrete architectural layers within the multi-tier application. In such examples, the method may further include directing the computer cluster to initiate the virtual machines in the identified order.

In some examples, the method may also include identifying a computer cluster that includes at least one node that provides at least one virtual machine configured to execute at least one discrete architectural layer within the multi-tier application. In such examples, the method may further include identifying another computer cluster that includes at least one other node that provides at least one other virtual machine configured to execute at least one other discrete architectural layer within the multi-tier application. In addition, the method may include identifying a priority level assigned to the multi-tier application and maintaining the multi-tier application's priority level across the computer cluster and the other computer cluster.

In one embodiment, a system for implementing the above-described method may include (1) an identification module programmed to identify at least one computer cluster that includes a plurality of nodes configured to (a) facilitate substantially continuous availability of at least one multi-tier application that includes a plurality of discrete architectural layers and (b) provide a plurality of virtual machines configured to execute the discrete architectural layers within the multi-tier application, (2) a detection module programmed to detect a failure that prevents at least one node within the computer cluster from providing at least one virtual machine configured to execute at least one discrete architectural layer within the multi-tier application, and (3) a failover module programmed to (a) identify a different node capable of providing the virtual machine within the computer cluster and (b) direct the different node within the computer cluster to provide the virtual machine in order to facilitate substantially continuous availability of all of the discrete architectural layers within the multi-tier application despite the detected failure.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify at least one computer cluster that includes a plurality of nodes configured to (a) facilitate substantially continuous availability of at least one multi-tier application that includes a plurality of discrete architectural layers and (b) provide a plurality of virtual machines configured to execute the discrete architectural layers within the multi-tier application, (2) detect a failure that prevents at least one node within the computer cluster from providing at least one virtual machine configured to execute at least one discrete architectural layer within the multi-tier application, (3) identify a different node capable of providing the virtual machine within the computer cluster, and then (4) direct the different node within the computer cluster to provide the virtual machine in order to facilitate substantially continuous availability of all of the discrete architectural layers within the multi-tier application despite the detected failure.

As will be explained in greater detail below, by ensuring that each virtual machine associated with a multi-tier application fails over during the failover process, the various systems and methods described herein may facilitate high availability of the multi-tier application within a computer cluster environment. In addition, by facilitating high availability of a multi-tier application within a computer cluster environment, these systems and methods may help reduce application downtime and/or customer dissatisfaction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
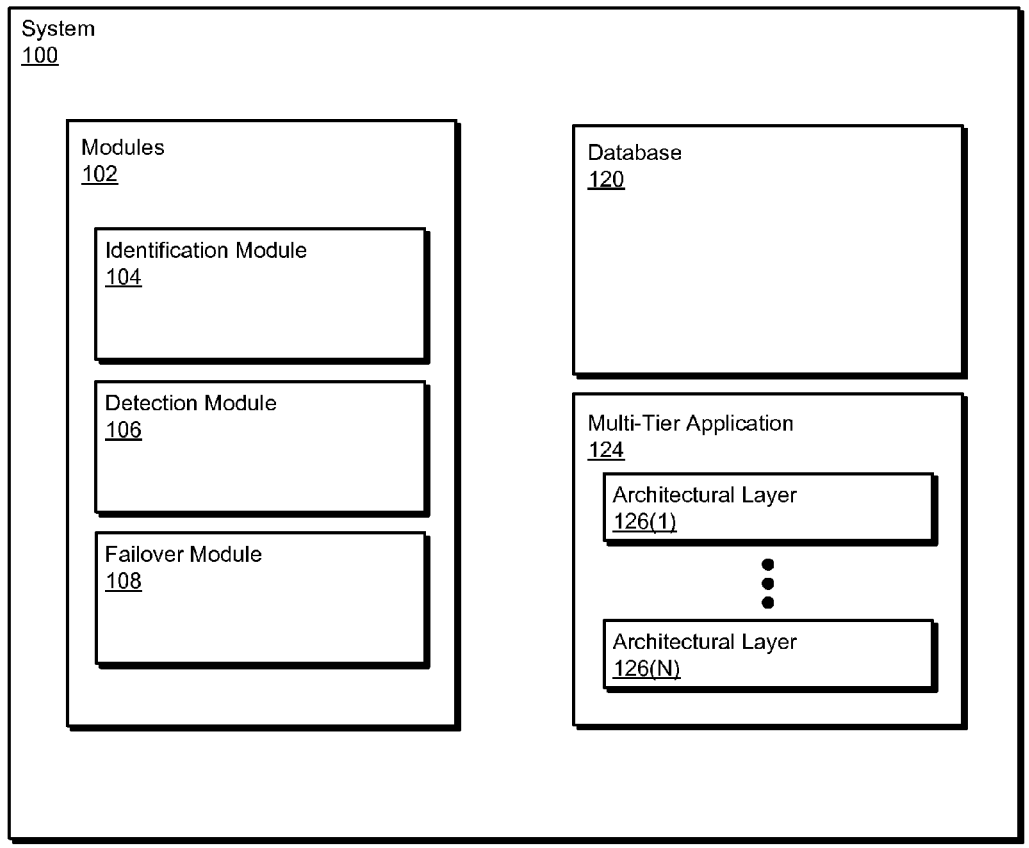
FIG. 1 is a block diagram of an exemplary system for facilitating substantially continuous availability of multi-tier applications within computer clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
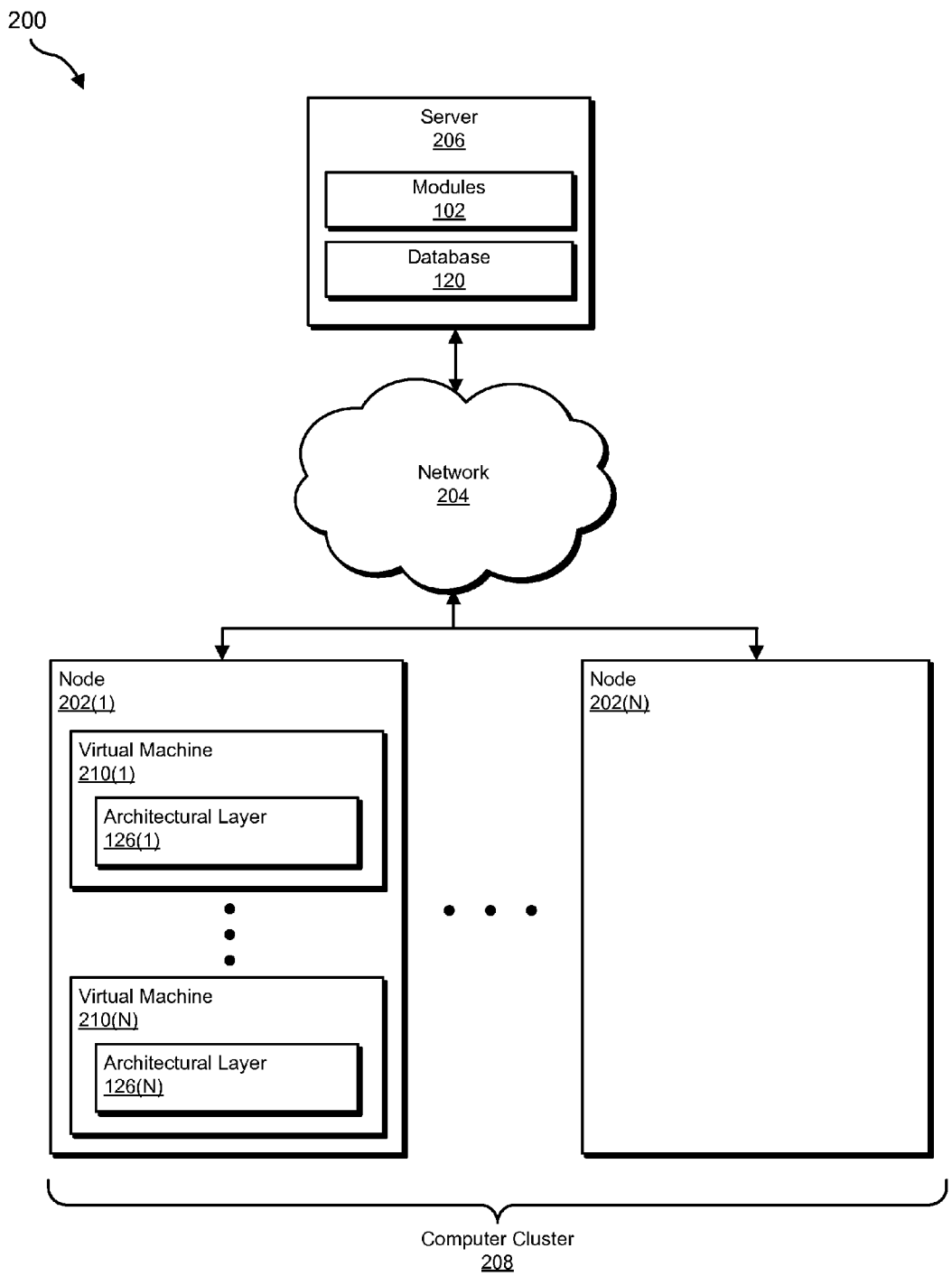
FIG. 2 is a block diagram of an exemplary system for facilitating substantially continuous availability of multi-tier applications within computer clusters.
Figure 3:
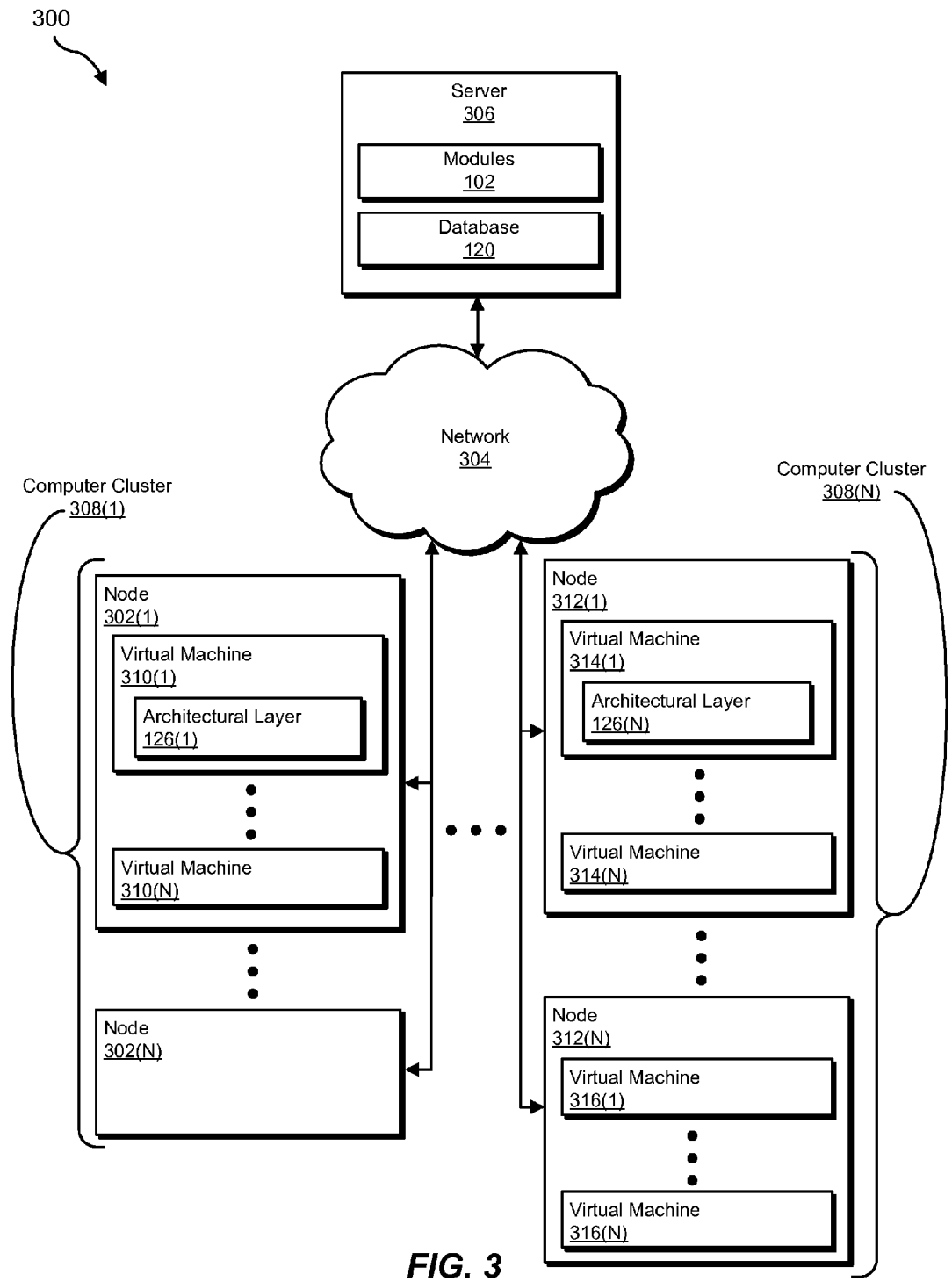
FIG. 3 is a block diagram of an exemplary system for facilitating substantially continuous availability of multi-tier applications within computer clusters.

The following will provide, with reference to FIGS. 1-3, detailed descriptions of exemplary systems for facilitating substantially continuous availability of multi-tier applications within computer clusters. Detailed descriptions of corresponding computer-implemented methods will also be provided in connection with FIG. 4, and detailed descriptions of exemplary cluster information, exemplary multi-tier application information, and exemplary priority information will be provided in connection with FIGS. 5-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for facilitating substantially continuous availability of multi-tier applications within computer clusters. As illustrated in this figure, exemplary system 100 may include one or more modules 102 for performing one or more tasks. For example, and as will be explained in greater detail below, exemplary system 100 may include an identification module 104 programmed to identify at least one computer cluster that includes a plurality of nodes configured to (1) facilitate substantially continuous availability of at least one multi-tier application that includes a plurality of discrete architectural layers and (2) provide a plurality of virtual machines configured to execute the discrete architectural layers within the multi-tier application.

In addition, and as will be described in greater detail below, exemplary system 100 may include a detection module 106 programmed to detect a failure that prevents at least one node within the computer cluster from providing at least one virtual machine configured to execute at least one discrete architectural layer within the multi-tier application. Exemplary system 100 may also include a failover module 108 programmed to (1) identify a different node capable of providing the virtual machine within the computer cluster and (2) direct the different node within the computer cluster to provide the virtual machine in order to facilitate substantially continuous availability of all of the discrete architectural layers within the multi-tier application despite the detected failure. Although illustrated as separate elements, one or more of modules 102 in FIG. 1 may represent portions of a single module or application (such as SYMANTEC'S VERITAS CLUSTER SERVER or VERITAS VOLUME MANAGER).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 202(1)-(N) and/or server 206), the devices illustrated in FIG. 3 (e.g., nodes 302(1)-(N), nodes 312(1)-(N), and/or server 306), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store any type or form of information associated with at least one computer cluster. For example, database 120 may be configured to store cluster information (such as cluster information 500 in FIG. 5) that identifies the configuration of at least one computer cluster within a computer cluster environment. In addition, database 120 may include additional information (such as multi-tier application information 502 in FIG. 5 and/or priority information 600 in FIG. 6) capable of being used to facilitate substantially continuous availability of at least one multi-tier application within the computer cluster.

Database 120 may represent portions of a single database or computing device or a plurality of databases or computing devices. For example, database 120 may represent a portion of one or more of nodes 202(1)-(N) and/or server 206 in FIG. 2, one or more of nodes 302(1)-(N) and 312(1)-(N) and/or server 306 in FIG. 3, computing system 710 in FIG. 7, and/or portions of exemplary network architecture 800 in FIG. 8. Alternatively, database 120 in FIG. 1 may represent one or more physically separate devices capable of being accessed by a computing device, such as one or more of nodes 202(1)-(N) and/or server 206 in FIG. 2, one or more of nodes 302(1)-(N) and 312(1)-(N) and/or server 306 in FIG. 3, computing system 710 in FIG. 7, and/or portions of exemplary network architecture 800 in FIG. 8.

As illustrated in FIG. 1, exemplary system 100 may also include one or more multi-tier applications. For example, exemplary system 100 may include a multi-tier application 124. In this example, multi-tier application 124 may include architectural layers 126(1)-(N). Examples of multi-tier application 124 include, without limitation, multi-tier financial applications, multi-tier web applications, multi-tier security applications, multi-tier interface applications, multi-tier gaming applications, multi-tier communication applications, multi-tier utility applications, multi-tier email applications, multi-tier media applications, combinations of one or more of the same, and/or any other suitable multi-tier applications.

Exemplary system 100 in FIG. 1 may be implemented in a variety of ways. For example, all or a portion of exemplary system 100 may represent portions of exemplary system 200 in FIG. 2 and/or exemplary system 300 in FIG. 3. As shown in FIG. 2, system 200 may represent a computer cluster 208 that includes nodes 202(1)-(N) in communication with a server 206 via a network 204. In addition, node 202(1) may include virtual machines 210(1)-(N) each configured to provide either a single-tier application or an application layer within a multi-tier application.

As shown in FIG. 3, system 300 may represent computer clusters 308(1)-(N) that include nodes 302(1)-(N) and 312(1)-(N) in communication with a server 306 via a network 304. In addition, nodes 302(1) and 312(1)-(N) may include virtual machines 310(1)-(N), 314(1)-(N), and 316(1)-(N) each configured to provide either a single-tier application or an application layer within a multi-tier application.

In one embodiment, one or more of modules 102 from FIG. 1 may, when executed by at least one processor of a computing device, enable computing device 202 to facilitate substantially continuous availability of multi-tier applications. For example, and as will be described in greater detail below, one or more of modules 102 may cause one or more of nodes 202(1)-(N), 302(1)-(N), and 312(1)-(N) and/or one or more of servers 206 and 306 to (1) identify at least one computer cluster (e.g., at least one of computer clusters 208 and 308(1)-(N)) that includes a plurality of nodes (e.g., nodes 202(1)-(N), 302(1)-(N), and/or 312(1)-(N)) configured to (a) facilitate substantially continuous availability of multi-tier application 124 that includes architectural layers 126(1)-(N) and (b) provide a plurality of virtual machines (e.g., virtual machines 210(1)-(N), 310(1), and/or 314(1)) configured to execute architectural layers 126(1)-(N) within multi-tier application 124, (2) detect a failure that prevents at least one node (e.g., at least one of nodes 202(1), 302(1), and 312(N)) within the computer cluster from providing at least one virtual machine configured to execute at least one architectural layer within multi-tier application 124, (3) identify a different node (e.g., node 202(N) or node 302(N)) capable of providing the virtual machine within the computer cluster, and then (4) direct the different node within the computer cluster to provide the virtual machine in order to facilitate substantially continuous availability of all of architectural layers 126(1)-(N) within multi-tier application 124 despite the detected failure.

Nodes 202(1)-(N), 302(1)-(N), and 312(1)-(N) generally represent any type or form of computing device capable of reading computer-executable instructions. Examples of nodes 202(1)-(N), 302(1)-(N), and 312(1)-(N) include, without limitation, laptops, desktops, servers, cellular phones, personal digital assistants (PDAs), multimedia players, embedded systems, combinations of one or more of the same, exemplary computing system 710 in FIG. 7, or any other suitable nodes.

Computer clusters 208 and 308(1)-(N) generally represent a group of two or more nodes (e.g., two or more of nodes 202(1)-(N), 302(1)-(N), and 312(1)-(N)) capable of communicating with one another to collectively perform one or more tasks, such as collectively providing high availability of at least one application (e.g., multi-tier application 124). Examples of computer clusters 208 and 308(1)-(N) include, without limitation, high-availability clusters, load-balancing clusters, Beowulf clusters, high-performance computing clusters, and/or any other suitable computer clusters. Although not illustrated in FIG. 2 or 3, computer clusters 208 and 308(1)-(N) may include one or more shared resources configured to store data associated with the application.

Servers 206 and 306 generally represent any type or form of computing device capable of managing, coordinating, and/or otherwise interfacing with nodes within computer clusters. Examples of server 206 and 306 include, without limitation, application servers, web servers, and database servers configured to run certain software applications and/or provide various web and/or database services. In one embodiment, although not illustrated in FIG. 2 or 3, servers 206 and 306 may each represent a node (e.g., a special-purpose node) within at least one computer cluster (e.g., at least one of computer clusters 208 and 308(1)-(N)).

Virtual machines 210(1)-(N), 310(1)-(N), and 314(1)-(N) generally represent any type or form of virtualized or emulated computing machine capable of reading computer-executable instructions and executing at least a portion of an application (e.g., at least one of architectural layers 126(1)-(N) within multi-tier application 124). Examples of virtual machines 210(1)-(N), 310(1)-(N), and 314(1)-(N) include, without limitation, system virtual machines, process virtual machines, application virtual machines, and/or any other suitable virtual machines.

Networks 204 and 304 generally represent any medium or architecture capable of facilitating communication or data transfer. Examples of networks 204 and 304 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Networks 204 and 304 may facilitate communication or data transfer using wireless or wired connections. In one embodiment, networks 204 and 304 may facilitate communication among the various devices included in computer clusters 208 and 308(1)-(N).

Figure 4:
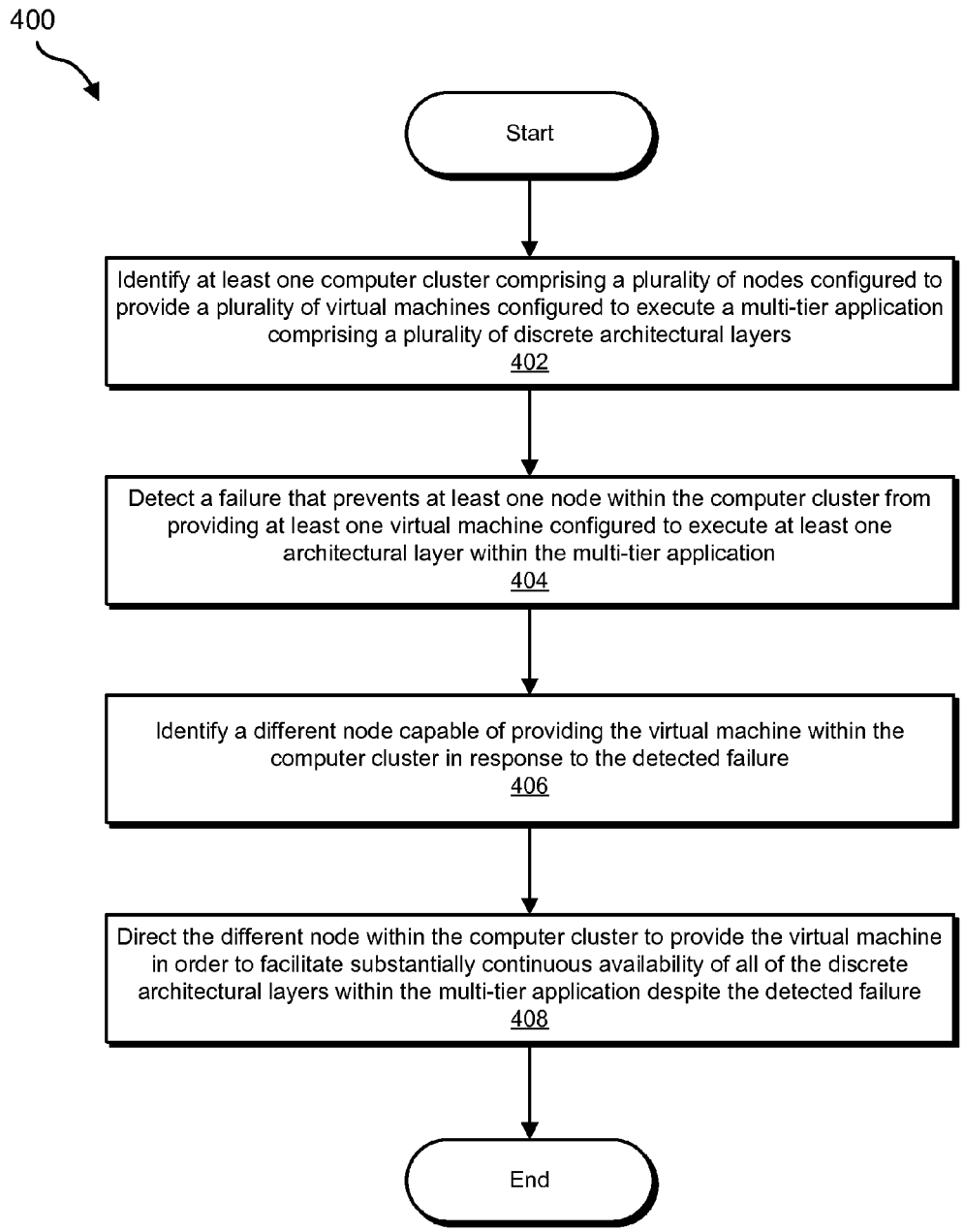
FIG. 4 is a flow diagram of an exemplary method for facilitating substantially continuous availability of multi-tier applications within computer clusters.

FIG. 4 is a flow diagram of an exemplary computer-implemented method 400 for facilitating substantially continuous availability of multi-tier applications within computer clusters. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 710 in FIG. 7, and/or portions of exemplary network architecture 800 in FIG. 8.

As illustrated in FIG. 4, at step 402 the various systems described herein may identify at least one computer cluster that includes a plurality of nodes configured to facilitate substantially continuous availability of at least one multi-tier application that includes a plurality of discrete architectural layers. For example, identification module 104 may, as part of server 206 (or, alternatively, as part of one or more of nodes 202(1)-(N)), identify computer cluster 208 and determine that nodes 202(1)-(N) within computer cluster 208 are configured to facilitate substantially continuous availability of multi-tier application 124. In this example, multi-tier application 124 may include architectural layers 126(1)-(N) each configured to perform or otherwise provide a different function (e.g., a presentation function, a business-logic function, and/or a database function) associated with multi-tier application 124.

Figure 5:
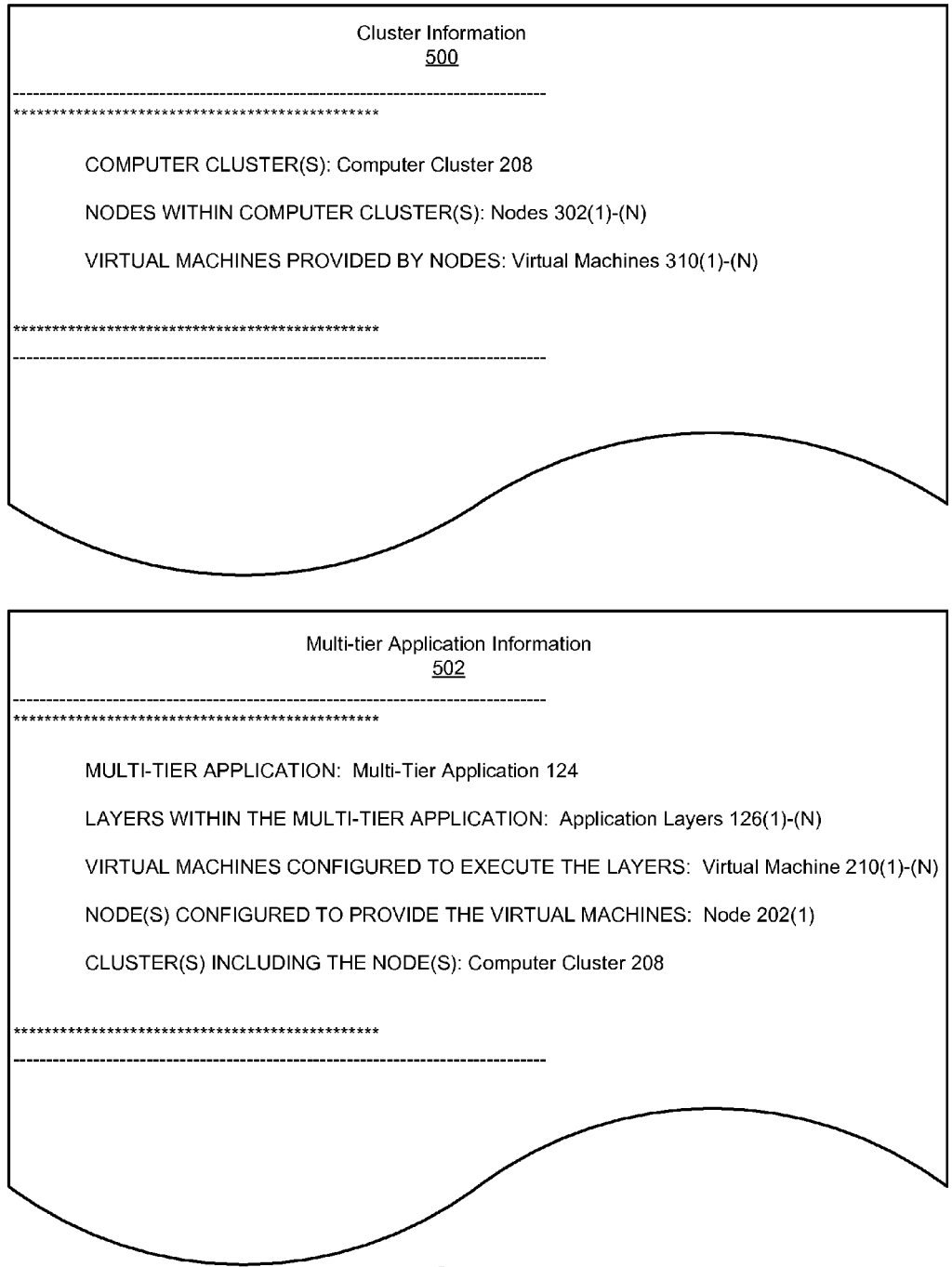
FIG. 5 is an illustration of exemplary cluster information and exemplary multi-tier application information.

The systems described herein may perform step 402 in a variety of ways. In some examples, identification module 104 may identify a computer cluster environment by accessing cluster information that identifies the computer cluster environment. For example, identification module 104 may access cluster information 500 stored in database 120. As illustrated in FIG. 5, cluster information 500 may identify the computer cluster(s) within a computer cluster environment (in this example, "Computer Cluster 208"), the nodes within the computer cluster(s) (in this example, "Nodes 202(1)-(N)") and the virtual machines provided by these nodes (in this example, "Virtual Machines 210(1)-(N)"). By analyzing cluster information 500, identification module 104 may determine that a computer cluster environment includes computer cluster 208, nodes 202(1)-(N), and/or virtual machines 210(1)-(N).

In some examples, identification module 104 may determine which node(s) within computer cluster 208 are currently providing the virtual machines configured to execute architectural layers 126(1)-(N) within multi-tier application 124. For example, identification module 104 may access multi-tier application information 502 stored in database 120. As illustrated in FIG. 5, multi-tier application information 502 may identify a multi-tier application running within a computer cluster environment (in this example, "Multi-tier Application 124"), the architectural layers within the multi-tier application (in this example, "Application Layers 126(1)-(N)"), the virtual machines configured to execute the architectural layers within the multi-tier application (in this example, "Virtual Machines 210(1)-(N)"), the node(s) configured to provide these virtual machines (in this example, "Node 202(1)"), the computer cluster(s) including the node(s) (in this example, "Computer Cluster 208"). By analyzing multi-tier application information 502, identification module 104 may determine that node 202(1) is currently providing virtual machines 210(1)-(N) configured to execute architectural layers 126(1)-(N) within multi-tier application 124.

In some examples, identification module 104 may identify a computer cluster environment by receiving messages from each node within the computer cluster environment. For example, identification module 104 may receive a message from each of nodes 202(1)-(N) within computer cluster 208. In this example, each message may indicate that the sending node represents part of computer cluster 208. By analyzing these messages, identification module 104 may determine that a computer cluster environment includes computer clusters 208 and/or nodes 202(1)-(N).

In some examples, these messages may also indicate whether the sending node is currently providing one or more of virtual machines 210(1)-(N) configured to execute one or more of architectural layers 126(1)-(N) within multi-tier application 124. For example, a message received from node 202(1) may indicate that node 202(1) is currently providing virtual machines 210(1)-(N) configured to execute architectural layers 126(1)-(N) within multi-tier application 124. Likewise, a message received from node 202(N) may indicate that node 202(N) is not currently providing any of virtual machines 210(1)-(N) configured to execute architectural layers 126(1)-(N) within multi-tier application 124. By analyzing these messages, identification module 104 may determine that only node 202(1) is currently providing virtual machines 210(1)-(N) configured to execute architectural layers 126(1)-(N) within multi-tier application 124.

In some examples, as illustrated in FIG. 2, a single node (e.g., node 202(1)) within a single computer cluster (e.g., computer cluster 208) may provide all of the virtual machines configured to execute architectural layers 126(1)-(N). In other examples, as illustrated in FIG. 3, multiple nodes (e.g., nodes 302(1) and 312(1)) within multiple computer clusters (e.g., computer clusters 308(1)-(N)) may provide the virtual machines configured to execute architectural layers 126(1)-(N). In further examples, although not illustrated in FIG. 2 or 3, multiple nodes within a single computer cluster may provide the virtual machines configured to execute architectural layers 126(1)-(N).

In some examples, identification module 104 may determine that one or more nodes within the computer cluster environment is currently providing one or more other virtual machines configured to execute one or more other applications. For example, identification module 104 may determine that node 202(1) within computer cluster 208 is currently providing one or more other virtual machines (not illustrated in FIG. 2) each configured to execute either a single-tier application or an architectural layer within another multi-tier application. In another example, identification module 104 may determine that another node (not illustrated in FIG. 2) within computer cluster 208 may provide one or more other virtual machines each configured to execute either a single-tier application or an architectural layer within another multi-tier application.

In one example, node 202(1) may currently be providing all of the virtual machines associated with a plurality of multi-tier applications. For example, as illustrated in FIG. 2, node 202(1) may currently be providing all of virtual machines 210(1)-(N) configured to execute architectural layers 126(1)-(N) within multi-tier application 124. In this example, node 202(1) may also be providing another set of virtual machines (not illustrated in FIG. 2) configured to execute each architectural layer within another multi-tier application. Identification module 104 may determine that node 202(1) is currently providing all of virtual machines 210(1)-(N) as well as the other set of virtual machines configured to execute each architectural layer within the other multi-tier application.

Returning to FIG. 3, identification module 104 may determine that nodes 302(1) and 312(1) within computer clusters 308(1)-(N) are configured to provide virtual machines 310(N) and 314(N), respectively. In this example, identification module 104 may further determine that virtual machines 310(N) and 314(N) are each configured to execute either a single-tier application or an architectural layer within another multi-tier application.

In a similar example, identification module 104 may determine that node 312(N) within computer cluster 308(N) may provide virtual machines 316(1)-(N). In this example, identification module 104 may further determine that virtual machines 316(1)-(N) are each configured to execute either a single-tier application or an architectural layer within another multi-tier application.

In some examples, multi-tier application 124 may be unable to function properly unless each of architectural layers 126(1)-(N) within multi-tier application 124 is provided by a virtual machine running on a node within the computer cluster environment. For example, architectural layers 126(1)-(N) may represent a presentation layer and a database layer, respectively, within a multi-tier financial application. In this example, the multi-tier financial application may be unable to facilitate successful account transactions without either the presentation layer or the database layer.

As illustrated in FIG. 4, at step 404 the various systems described herein may detect a failure that prevents at least one node within the computer cluster from providing at least one virtual machine configured to execute at least one discrete architectural layer within the multi-tier application. For example, detection module 106 may, as part of server 206 (or, alternatively, as part of one or more of nodes 202(1)-(N)), detect a failure that prevents node 202(1) from providing one or more of virtual machines 210(1)-(N) configured to execute architectural layers 126(1)-(N) within multi-tier application 124.

The systems described herein may perform step 404 in a variety of ways. In some examples, detection module 106 may monitor the nodes within the computer cluster environment in an attempt to detect any node failures within the computer cluster environment. For example, detection module 106 may implement a polling mechanism configured to periodically poll nodes 202(1)-(N) within computer cluster 208 to determine whether any of nodes 202(1)-(N) has failed. In this example, as part of the polling mechanism, detection module 106 may receive periodic heartbeats from nodes 202(1)-(N). Each periodic heartbeat may indicate that the sending node is currently healthy.

However, if detection module 106 does not receive a timely heartbeat from node 202(1), detection module 106 may determine that node 202(1)-(N) has experienced a failure. For example, node 202(1) may experience a failure that prevents node 202(1) from continuing to provide virtual machines 210(1)-(N) configured to execute architectural layers 210(1)-(N) within multi-tier application 124. In this example, the failure may also prevent node 202(1) from sending a timely heartbeat to detection module 106 as part of the polling mechanism.

As a result, detection module 106 may fail to receive a timely heartbeat from node 202(1) as part of the polling mechanism. Detection module 106 may then determine that node 202(1) has experienced a failure that prevents node 202(1) from providing virtual machines 210(1)-(N) since detection module 106 did not receive a timely heartbeat from node 202(1).

In another example, detection module 106 may implement a failure-reporting system with nodes 202(1)-(N) within computer cluster 208. For example, as part of the failure-reporting system, detection module 106 may receive a message from an operating system kernel installed on node 202(1). In this example, the received message may indicate that a cluster agent installed on node 202(1) has experienced a system failure. For example, the received message may specify that the cluster agent installed on node 202(1) has stalled and is no longer running on node 202(1). Detection module 106 may then determine that node 202(1) is no longer providing virtual machines 210(1)-(N) since the cluster agent installed on node 202(1) has stalled and is no longer running on node 202(1).

In one example, upon detecting a failure on node 202(1) within compute cluster 208, detection module 106 may access multi-tier application information 502 to check whether node 202(1) was providing one or more virtual machines configured to execute one or more of architectural layers 126(1)-(N) at the time of the failure. In this example, by checking multi-tier application information 502, detection module 106 may determine that node 202(1) was providing virtual machines 210(1)-(N) at the time of the failure.

In one example, returning to FIG. 3, detection module 106 may access other multi-tier application information to check whether node 302(1) was providing one or more virtual machines configured to execute one or more of architectural layers 126(1)-(N) at the time of the failure. In this example, by checking the other multi-tier application information, detection module 106 may determine that node 302(1) was providing virtual machine 310(1) configured to execute architectural layer 126(1) at the time of the failure. In addition, by checking the other multi-tier application information, detection module 106 may determine that the failure of node 302(1) has not impaired node 312(N) from providing virtual machine 314(1) configured to execute architectural layer 126(N). In other words, node 312(N) may still be able to provide virtual machine 314(1) configured to execute architectural layer 126(N) despite the failure detected on node 302(1).

In another example, detection module 106 may determine that the failure has also affected node 312(N). For example, detection module 106 may determine that the failure impaired node 312(N) such that node 312(N) is no longer able to provide virtual machines 316(1)-(N) within computer cluster 308(N). In this example, virtual machines 316(1)-(N) may each be configured to execute either a single-tier application or an architectural layer within another multi-tier application.

Additionally or alternatively, detection module 106 may determine that the failure has also affected node 302(N). For example, detection module 106 may determine that the failure impaired node 302(N) such that node 302(N) is no longer able to provide any virtual machines within computer cluster 308(1). In this example, the failure's impairment of node 302(N) may render node 302(N) ineligible to be a failover node that assumes responsibility for virtual machine 310(1) configured to execute architectural layer 126(1).

As illustrated in FIG. 4, at step 406 the various systems described herein may identify a different node capable of providing the virtual machine within the computer cluster in response to the detected failure. For example, failover module 108 may, as part of server 206 (or, alternatively, as part of one or more of nodes 202(1)-(N)), determine that node 202(N) is capable of being a failover node that provides virtual machines 210(1)-(N) within computer cluster 208 in response to the failure detected on node 202(1).

The systems described herein may perform step 406 in a variety of ways. In some examples, failover module 108 may select node 202(N) as the failover node. For example, failover module 108 may ensure that the failure detected on node 202(1) did not affect node 202(N). In this example, failover module 108 may select node 202(N) as the failover node since the detected failure did not impair that node's ability to provide one or more virtual machines.

In some examples, failover module 108 may select node 202(N) as the failover node based at least in part on the current load and/or capacity of node 202(N). For example, failover module 108 may determine that node 202(N) is not currently providing any virtual machines within computer cluster 208. In this example, failover node 108 may also determine that node 202(N) has the capacity to provide all of virtual machines 210(1)-(N) configured to execute architectural layers 126(1)-(N). Failover module 108 may then select node 202(N) as the failover node since node 202(N) has the capacity to provide all of virtual machines 210(1)-(N).

In some examples, failover module 108 may select the failover node based at least in part on the extent of the detected failure. For example, returning to FIG. 3, if the failure did not impair node 302(N), failover module 108 may select node 302(N) as the failover node since node 302(N) has the lightest load within the computer cluster environment. However, if the failure impaired node 302(N), failover module 108 may select node 312(1) as the failover node since the failure's impairment of node 302(N) has rendered node 302(N) ineligible to be the failover node.

As illustrated in FIG. 4, at step 408 the various systems described herein may direct the different node within the computer cluster to provide the virtual machine in order to facilitate substantially continuous availability of all of the discrete architectural layers within the multi-tier application despite the detected failure. For example, failover module 108 may, as part of server 206 (or, alternatively, as part of one or more of nodes 202(1)-(N)), direct node 202(N) to provide virtual machines 210(1)-(N) upon identifying node 202(N) as the failover node. In this example, by directing node 202(N) to provide virtual machines 210(1)-(N) upon identifying node 202(N) as the failover node, failover module 108 may facilitate substantially continuous availability of all of architectural layers 126(1)-(N) within multi-tier application 124.

The systems described herein may perform step 408 in a variety of ways. In one example, node 202(N) may include clones of virtual machines 210(1)-(N) (e.g., disk images that are substantially similar to virtual machines 210(1)-(N)). In this example, failover module 108 may direct node 202(N) to provide the clones of virtual machines 210(1)-(N) in response to the failure detected on node 202(1).

In one example, failover module 108 may determine that the failover node is incapable of simultaneously providing virtual machines 210(1)-(N) and one or more other virtual machines displaced by the failure. For example, node 202(1) may have been providing virtual machines 210(1)-(N) and another set of virtual machines (not illustrated in FIG. 2) configured to execute each architectural layer within another multi-tier application at the time of the failure. In this example, failover module 108 may determine that node 202(N) does not have the capacity to simultaneously provide all of virtual machines 210(1)-(N) and the other set of virtual machines associated with the other multi-tier application after the failure.

In response to this determination, failover module 108 may direct node 202(N) to provide all of virtual machines 210(1)-(N) associated with multi-tier application 124 instead of any of the other virtual machines associated with the other multi-tier application. In other words, failover module 108 may direct node 202(N) to provide all of the virtual machines associated with a single multi-tier application rather than providing only a subset of the virtual machines associated with one multi-tier application and a subset of the other virtual machines associated with the other multi-tier application. By directing node 202(N) to provide all of virtual machines 210(1)-(N) associated with multi-tier application 124, failover module 108 may ensure that multi-tier application 124 remains highly available within computer cluster 208 after the failure.

In one example, returning to FIG. 3, failover module 108 may determine that the failover node is incapable of simultaneously providing virtual machine 310(1) and one or more other virtual machines displaced by the failure. For example, if failover module 108 selected node 302(N) as the failover node in response to a failure impairing both node 302(1) and node 312(N), failover module 108 may determine that node 302(N) does not have the capacity to simultaneously provide virtual machine 310(1) and virtual machines 316(1)-(N) displaced by the failure. In this example, failover module 108 may select which virtual machines to fail over to node 302(N) based at least in part on priority levels associated with the applications provided by the virtual machines.

Figure 6:
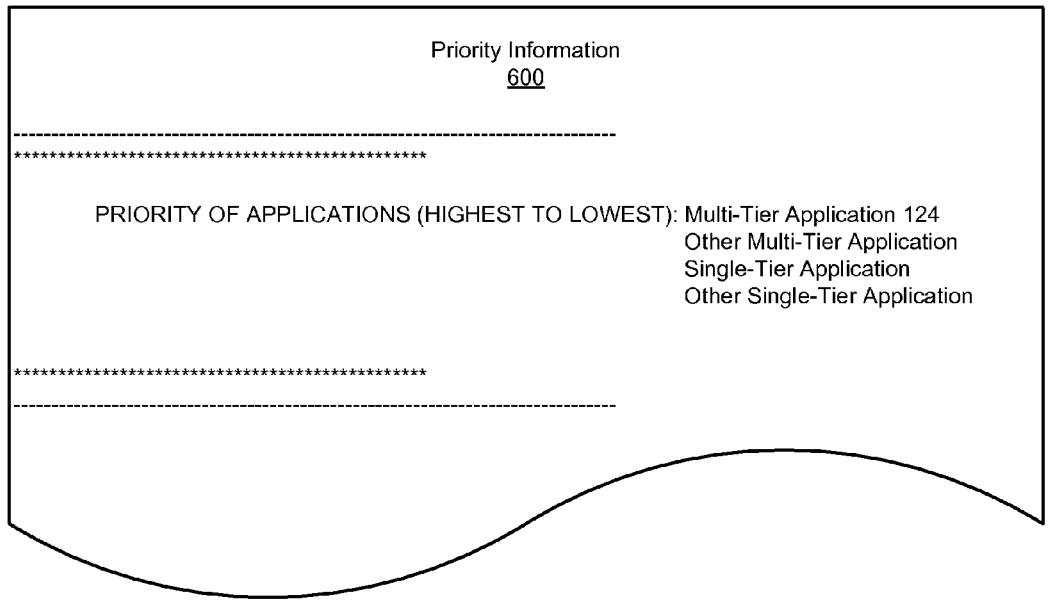
FIG. 6 is an illustration of exemplary priority information.

In one example, failover module 108 may identify a priority level assigned to multi-tier application 124 and a priority level assigned to another multi-tier application provided by virtual machines 316(1)-(N). For example, failover module 108 may access priority information 600 stored in database 120. As illustrated in FIG. 6, priority information 600 may identify a priority of applications from highest priority to lowest priority within the computer cluster environment (in this example, "Multi-tier Application 124," "Other Multi-tier Application," "Single-tier Application," and "Other Single-tier Application"). Failover module 108 may maintain the priority levels identified in priority information 600 across computer clusters 308(1)-(N).

In one example, failover module 108 may analyze priority information 600 and then determine, based at least in part on the priority levels identified in priority information 600, that multi-tier application 124 has priority over the other multi-tier application provided by virtual machines 316(1)-(N). In response to this determination, failover module 108 may direct node 302(N) to provide virtual machine 310(1) instead of virtual machines 316(1)-(N) since multi-tier application 124 has priority over the other multi-tier application provided by virtual machines 316(1)-(N).

In one example, if failover module 108 selected node 312(1) as the failover node in response to a failure impairing nodes 302(1)-(N), failover module 108 may determine that node 312(N) does not have the capacity to simultaneously provide virtual machines 314(1)-(N) and virtual machine 310(1) displaced by the failure. In this example, failover module 108 may determine that virtual machine 314(N) is configured to execute a single-tier application that has lesser priority than multi-tier application 124. In response to this determination, failover module 108 may direct node 312(1) to replace virtual machine 314(N) with virtual machine 310(1) since multi-tier application 124 has priority over the single-tier application provided by virtual machine 314(N).

In some examples, failover node 108 may identify an order in which the computer cluster(s) are to initiate the virtual machines associated with multi-tier application 124 after the failover process. In one example, if failover module 108 selected node 312(1) as the failover node, failover module 108 may direct node 312(1) to initiate the virtual machines associated with multi-tier application 124 in a specific order. For example, failover module 108 may direct node 312(1) to initiate (in this order) the virtual machine configured to provide the database layer within multi-tier application 124, the virtual machine configured to provide the business-logic layer within multi-tier application 124, and then the virtual machine configured to provide the presentation layer within multi-tier application 124. In addition, node 312(1) may stop the virtual machines in the reverse order. Upon completion of step 408, exemplary method 400 in FIG. 4 may terminate.

The systems described herein may be implemented in a variety of other ways. For example, a computer cluster may include two nodes (N1 and N2). In this example, N1 may be configured to execute a multi-tier application (MTA1) that includes three virtual machines, each representing a load of 20 units. N1 may also be configured to execute another multi-tier application (MTA2) that includes three other virtual machines, each representing a load of 20 units.

In one example, if the N1 experiences a failure that prevents execution of MTA1 and MTA2, the computer cluster may only have 60 units of load capacity available on N2. As a result, failover module 108 may be unable to fail over all of the virtual machines associated with MTA1 and MTA2. In other words, failover module 108 may need to select a subset of the virtual machines associated with MTA1 and MTA2 to fail over to N2 during the failover process.

In this example, since N2 only has a load capacity of 60 units and each virtual machine represents a load of 20 units, failover module 108 may have the option of selecting (1) one virtual machine associated with MTA1 and two virtual machines associated with MTA2, (2) two virtual machines associated with MTA1 and one virtual machine associated with MTA2, (3) all three virtual machines associated with MTA1, or (4) all three virtual machines associated with MTA2. However, in order to facilitate substantially continuous availability of either MTA1 or MTA2, failover module 108 may need to select either all three of the virtual machines associated with MTA1 or all three of the virtual machines associated with MTA2 to fail over to N2 during the failover process.

In another example, a computer cluster may include four nodes (N1, N2, N3, and N4) that each have a load capacity of 120 units. In this example, the computer cluster may be configured to execute three multi-tier applications (MTA1, MTA2, and MTA3) that each include a plurality of virtual machines. For example, MTA1 may include three virtual machines (VM1, VM2, and VM3) that each represent a load of 40 units, MTA2 may include three other virtual machines (VM4, VM5, and VM6) that each represent a load of 40 units, and MTA3 may include three additional virtual machines (VM7, VM8, and VM9) that each represent a load of 40 units.

In one example, N1 may be configured to execute VM1, VM2, and VM4, N2 may be configured to execute VM3, VM5, and VM6, N3 may be configured to execute VM7, and N4 may be configured to execute VM8 and VM9. In this example, N1 and N2 may experience a failure that prevents execution of VM1, VM2, VM3, VM4, VM5, and VM6 (i.e., the virtual machines associated with MTA1 and MTA2).

Since N3 and N4 only have 120 units of load capacity collectively available after the failure and each virtual machine represents a load of 40 units, failover module 108 may need to select a subset of the virtual machines associated with MTA1 and MTA2 to fail over to N3 and N4 during the failover process. In other words, in response to detection of the failure, failover module 108 may need to determine which virtual machines associated with MTA1 and MTA2 to fail over during the failover process.

In one example, if MTA1 has priority over MTA2, failover module 108 may ensure that VM1, VM2, and VM3 fail over during the failover process. For example, failover module 108 may direct VM1 and VM2 to fail over to N3 during the failover process. In this example, failover module 108 may also direct VM3 to fail over to N4 during the failover process.

In another example, if MTA2 has priority over MTA1, failover module 108 may ensure that VM4, VM5, and VM6 fail over during the failover process. For example, failover module 108 may direct VM4 and VM5 to fail over to N3 during the failover process. In this example, failover module 108 may also direct VM6 to fail over to N4 during the failover process.

In a further example, if MTA1 and MTA2 have equal priority levels, failover module 108 may ensure that each of VM1, VM2, and VM3 or each of VM4, VM5, and VM6 fails over during the failover process. By ensuring that each of the virtual machines associated with either MTA1 or MTA2 fails over during the failover process, failover module 108 may facilitate substantially continuous availability of either MTA1 or MTA2 despite the failure experienced by N1 and N2.

As explained above, by ensuring that each virtual machine associated with a multi-tier application fails over during the failover process, the various systems and methods described herein may facilitate high availability of the multi-tier application within a computer cluster environment. In addition, by facilitating high availability of a multi-tier application within a computer cluster environment, these systems and methods may help reduce application downtime and/or customer dissatisfaction.

Figure 7:
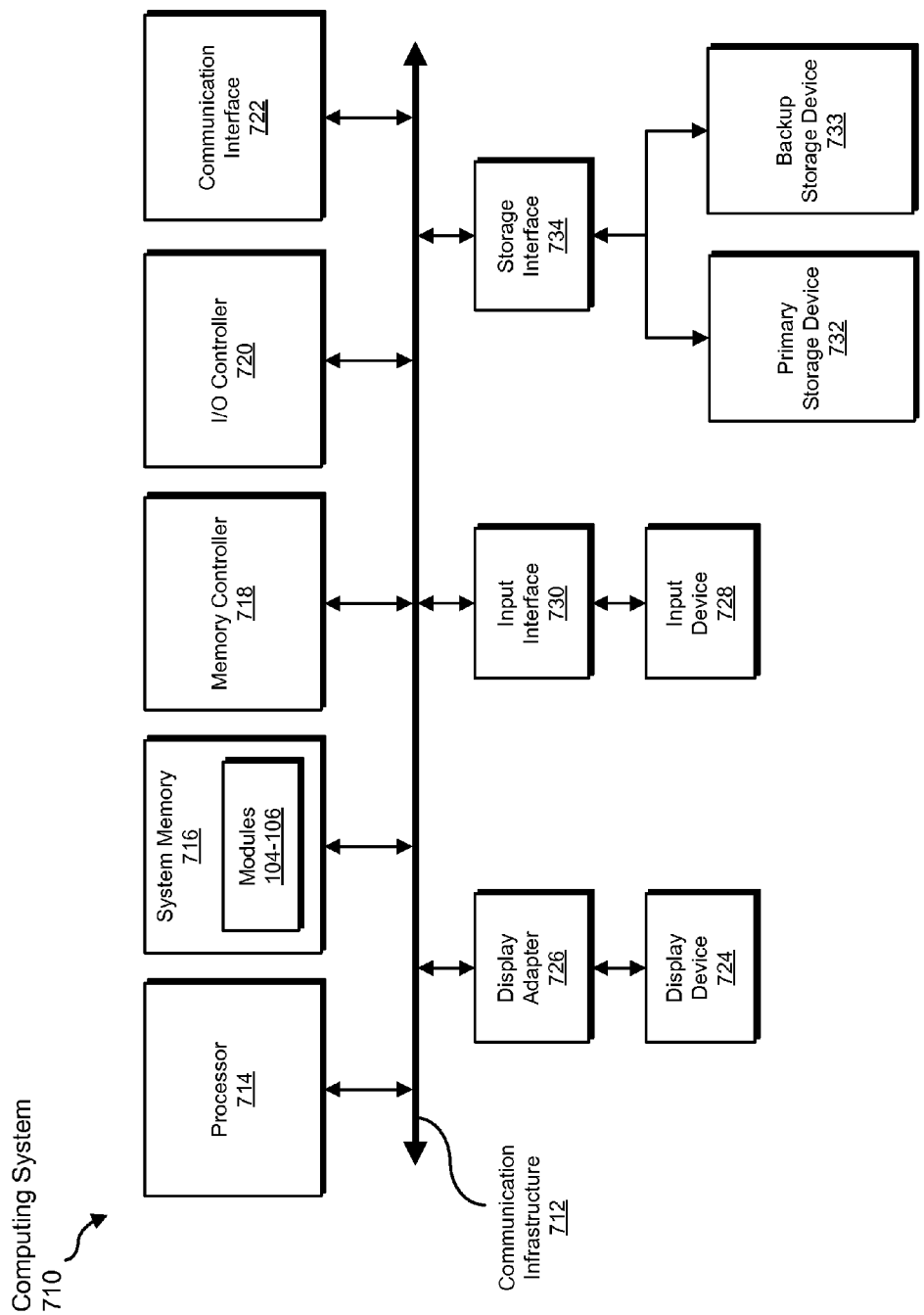
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, facilitating, providing, detecting, directing, determining, accessing, and maintaining steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
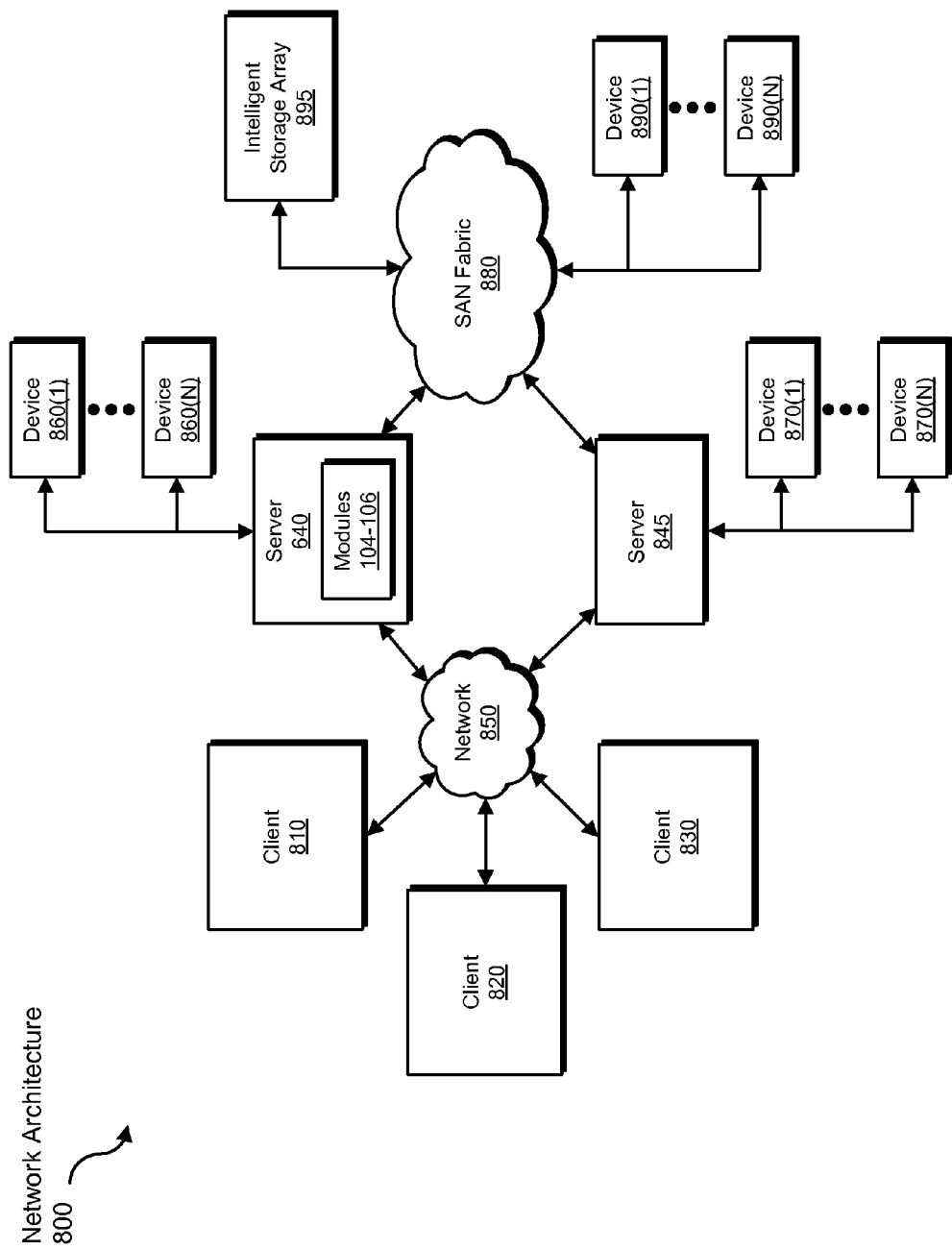
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, facilitating, providing, detecting, directing, determining, accessing, and maintaining steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for facilitating substantially continuous availability of multi-tier applications within computer clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a characteristic or property of one or more physical devices (such as one or more of nodes 202(1)-(N) and/or server 206 in FIG. 2) by facilitating substantially continuous availability of multi-tier applications within computer clusters.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating substantially continuous availability of multi-tier applications within computer clusters, at least a portion of the method being performed by a computing device comprising at least one processor, the method comprising:
   identifying at least one computer cluster comprising a plurality of nodes configured to:
      facilitate substantially continuous availability of at least one multi-tier application comprising a plurality of discrete architectural layers;
      provide a plurality of virtual machines configured to execute the discrete architectural layers within the multi-tier application;
   detecting a failure that prevents at least one node within the computer cluster from providing at least one virtual machine configured to execute at least one discrete architectural layer within the multi-tier application;
   in response to detecting the failure:
      identifying a different node capable of providing the virtual machine within the computer cluster;
      directing the different node within the computer cluster to provide the virtual machine in order to facilitate substantially continuous availability of all of the discrete architectural layers within the multi-tier application despite the detected failure by:
         identifying all of the virtual machines configured to execute the discrete architectural layers within the multi-tier application;
         ensuring that the computer cluster provides all of the identified virtual machines after the detected failure.

2. The method of claim 1, wherein identifying the computer cluster comprises identifying at least one other virtual machine configured to execute at least one other application within the computer cluster.

3. The method of claim 2, wherein identifying the other virtual machine comprises identifying a plurality of other virtual machines configured to execute at least one other multi-tier application comprising a plurality of other discrete architectural layers.

4. The method of claim 2, wherein identifying the computer cluster comprises at least one of:
   determining that the node is configured to simultaneously provide both the virtual machine configured to execute the discrete architectural layer within the multi-tier application and the other virtual machine configured to execute the other application;
   determining that at least one other node within the computer cluster is configured to provide the other virtual machine configured to execute the other application.

5. The method of claim 2, wherein directing the different node within the computer cluster to provide the virtual machine comprises:
   determining that the different node is incapable of simultaneously providing both the virtual machine configured to execute the discrete architectural layer within the multi-tier application and the other virtual machine configured to execute the other application;
identifying a priority level assigned to the multi-tier application;
identifying another priority level assigned to the other application;
determining, based at least in part on the priority level and the other priority level, that the multi-tier application has priority over the other application;
in response to determining that the multi-tier application has priority over the other application, directing the different node within the computer cluster to provide the virtual machine configured to execute the discrete architectural layer within the multi-tier application instead of the other virtual machine configured to execute the other application.

6. The method of claim 5, wherein directing the different node within the computer cluster to provide the virtual machine instead of the other virtual machine comprises:
determining that the different node is currently configured to provide the other virtual machine;
in response to determining that the different node is currently configured to provide the other virtual machine, directing the different node to replace the other virtual machine with the virtual machine configured to execute the discrete architectural layer within the multi-tier application.

7. The method of claim 1, wherein detecting the failure that prevents the node from providing the virtual machine configured to execute the discrete architectural layer within the multi-tier application comprises:
detecting a failure on the node;
accessing information that identifies the nodes on which the virtual machines are configured to execute the discrete architectural layers within the multi-tier application;
determining, based at least in part on the information, that the failed node was configured to execute the virtual machine.

8. The method of claim 1, wherein identifying the different node capable of providing the virtual machine within the computer cluster comprises:
identifying the different node's capacity to provide virtual machines;
determining, based at least in part on the different node's capacity, that the different node is capable of providing the virtual machine after the detected failure.

9. The method of claim 1, wherein directing the different node within the computer cluster to provide the virtual machine comprises:
identifying an order in which the computer cluster is to initiate the virtual machines configured to execute the discrete architectural layers within the multi-tier application;
directing the computer cluster to initiate the virtual machines in the identified order.

10. The method of claim 1, wherein identifying the computer cluster comprises:
identifying a computer cluster comprising at least one node configured to provide at least one virtual machine configured to execute at least one discrete architectural layer within the multi-tier application;
identifying another computer cluster comprising at least one other node configured to provide at least one other virtual machine configured to execute at least one other discrete architectural layer within the multi-tier application.

11. The method of claim 10, further comprising:
identifying a priority level assigned to the multi-tier application;
maintaining the multi-tier application's priority level across the computer cluster and the other computer cluster.

12. A system for facilitating substantially continuous availability of multi-tier applications within computer clusters, the system comprising:
an identification module programmed to identify at least one computer cluster comprising a plurality of nodes configured to:
facilitate substantially continuous availability of at least one multi-tier application comprising a plurality of discrete architectural layers;
provide a plurality of virtual machines configured to execute the discrete architectural layers within the multi-tier application;
a detection module programmed to detect a failure that prevents at least one node within the computer cluster from providing at least one virtual machine configured to execute at least one discrete architectural layer within the multi-tier application;
a failover module programmed to, in response to the detected failure:
identify a different node capable of providing the virtual machine within the computer cluster;
direct the different node within the computer cluster to provide the virtual machine in order to facilitate substantially continuous availability of all of the discrete architectural layers within the multi-tier application despite the detected failure by:
identifying all of the virtual machines configured to execute the discrete architectural layers within the multi-tier application;
ensuring that the computer cluster provides all of the identified virtual machines after the detected failure;
at least one processor configured to execute the identification module, the detection module, and the failover module.

13. The system of claim 12, wherein the identification module is programmed to identify at least one other virtual machine configured to execute at least one other application within the computer cluster.

14. The system of claim 13, wherein the identification module is programmed to identify a plurality of other virtual machines configured to execute at least one other multi-tier application comprising a plurality of other discrete architectural layers.

15. The system of claim 13, wherein the identification module is programmed to at least one of:
determine that the node is configured to simultaneously provide both the virtual machine configured to execute the discrete architectural layer within the multi-tier application and the other virtual machine configured to execute the other application;
determine that at least one other node within the computer cluster is configured to provide the other virtual machine configured to execute the other application.

16. The system of claim 13, wherein the failover module is programmed to:
determine that the different node is incapable of simultaneously providing both the virtual machine configured to execute the discrete architectural layer within the multi-tier application and the other virtual machine configured to execute the other application;
identify a priority level assigned to the multi-tier application;
identify another priority level assigned to the other application;
determine, based at least in part on the priority level and the other priority level, that the multi-tier application has priority over the other application;
direct, in response to determining that the multi-tier application has priority over the other application, the different node within the computer cluster to provide the virtual machine configured to execute the discrete architectural layer within the multi-tier application instead of the other virtual machine configured to execute the other application.

17. The system of claim 16, wherein the failover module is programmed to:
determine that the different node is currently configured to provide the other virtual machine;
direct, in response to determining that the different node is currently configured to provide the other virtual machine, the different node to replace the other virtual machine with the virtual machine configured to execute the discrete architectural layer within the multi-tier application.

18. The system of claim 12, wherein the detection module is programmed to:
detect a failure on the node;
access information that identifies the nodes on which the virtual machines are configured to execute the discrete architectural layers within the multi-tier application;
determine, based at least in part on the information, that the failed node was configured to execute the virtual machine.

19. A non-transitory computer-readable-storage medium comprising one or more computer-executable instructions that, when executed by at least one processor of a computing device, cause the computing device to:
identify at least one computer cluster comprising a plurality of nodes configured to:
facilitate substantially continuous availability of at least one multi-tier application comprising a plurality of discrete architectural layers;
provide a plurality of virtual machines configured to execute the discrete architectural layers within the multi-tier application;
detect a failure that prevents at least one node within the computer cluster from providing at least one virtual machine configured to execute at least one discrete architectural layer within the multi-tier application;
in response to the detected failure:
identify a different node capable of providing the virtual machine within the computer cluster;
direct the different node within the computer cluster to provide the virtual machine in order to facilitate substantially continuous availability of all of the discrete architectural layers within the multi-tier application despite the detected failure by:
identifying all of the virtual machines configured to execute the discrete architectural layers within the multi-tier application;
ensuring that the computer cluster provides all of the identified virtual machines after the detected failure.

* * * * *